April 13, 1926.  1,580,997

G. H. CONRAD

SUPERCHARGER FOR INTERNAL COMBUSTION ENGINES

Filed June 30, 1924  3 Sheets-Sheet 1

INVENTOR
George Harfield Conrad.
BY
Albert E. Dietrich
ATTORNEY

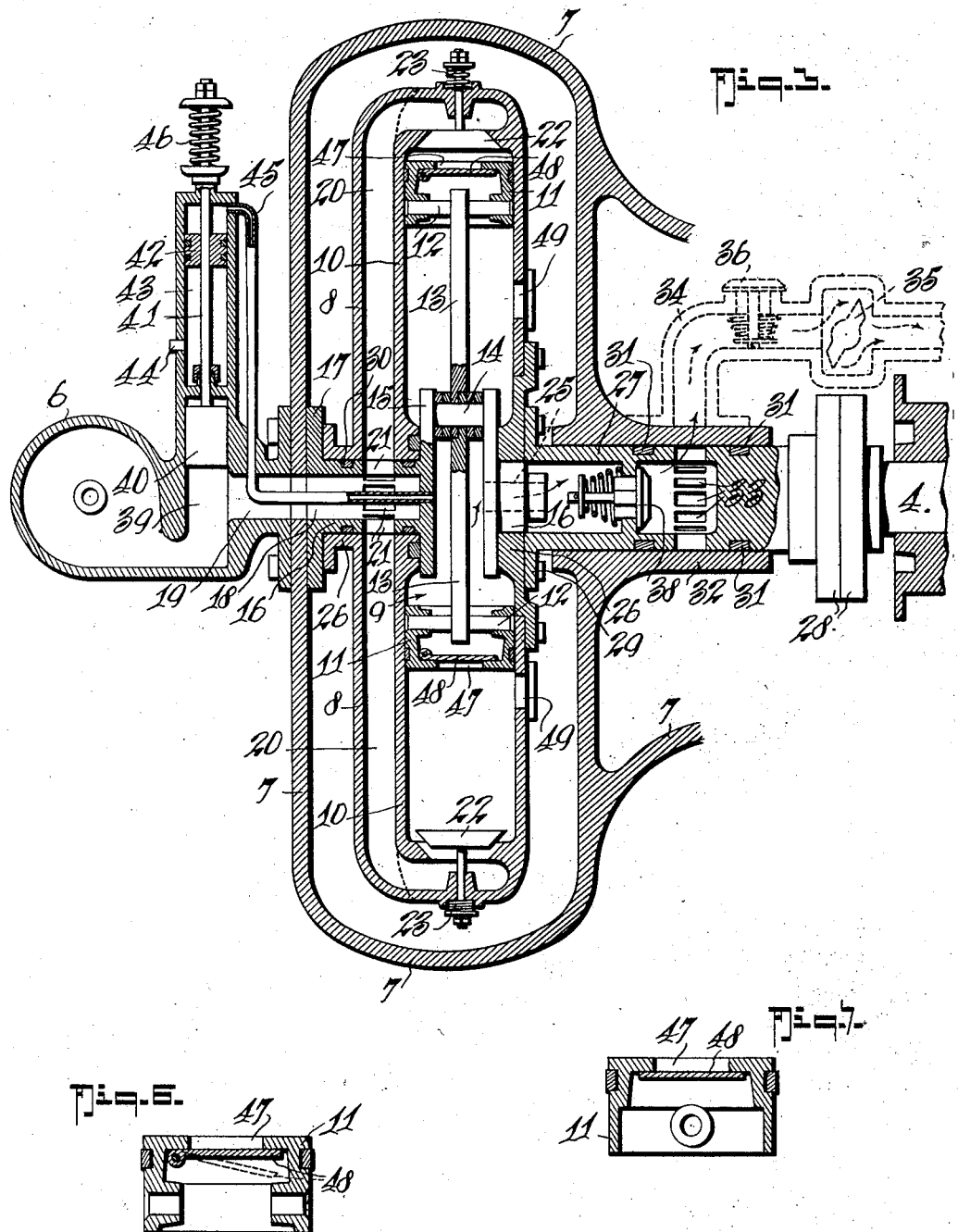

April 13, 1926.
G. H. CONRAD
SUPERCHARGER FOR INTERNAL COMBUSTION ENGINES
Filed June 30, 1924  3 Sheets-Sheet 3
1,580,997
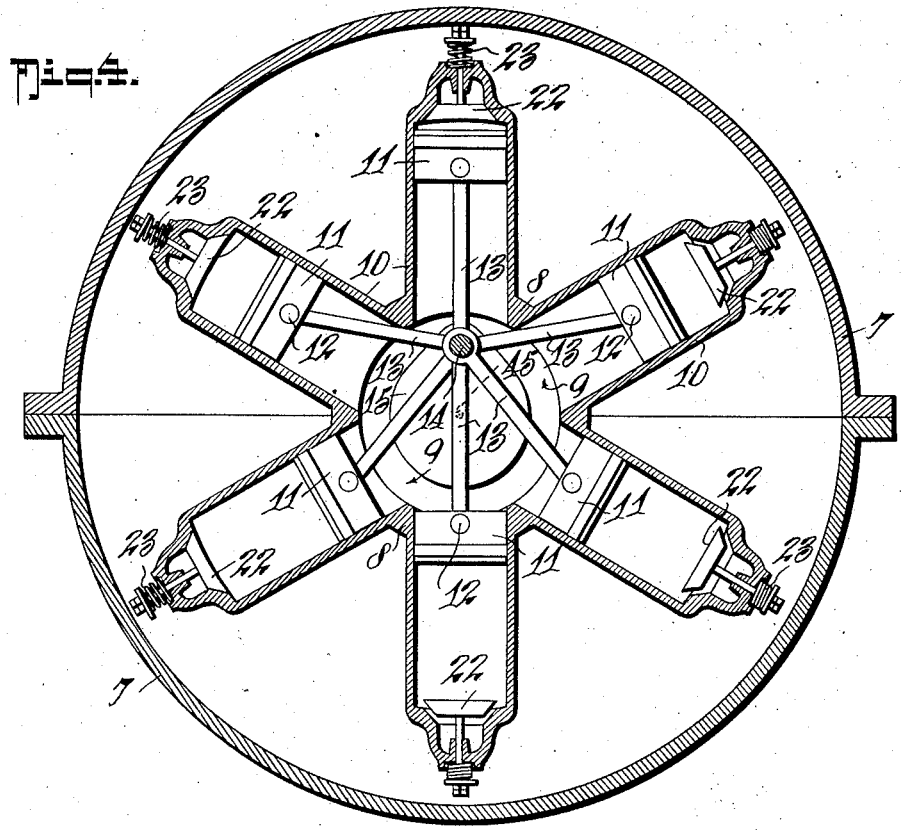
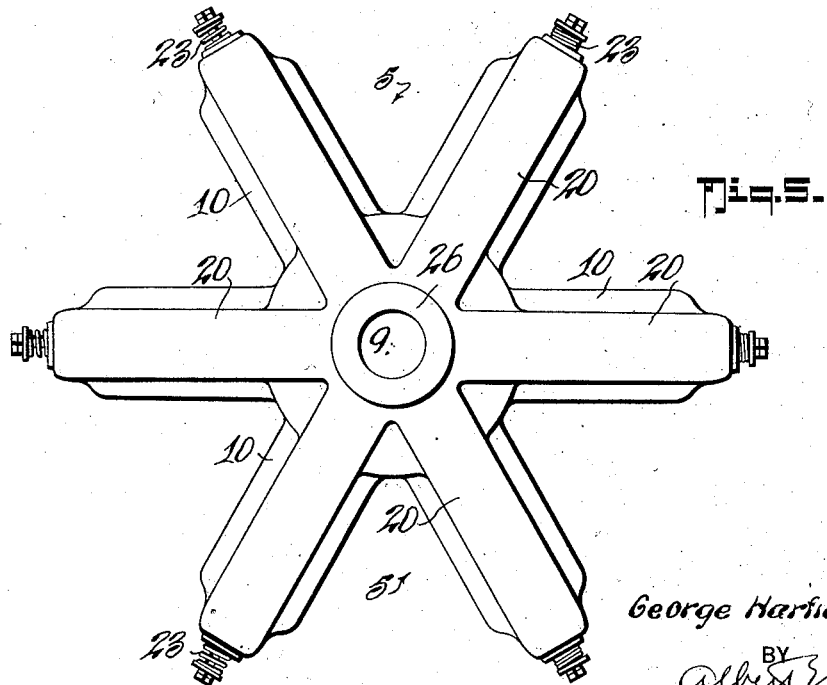
INVENTOR
George Harfield Conrad.
BY
ATTORNEY Patented Apr. 13, 1926.

1,580,997

UNITED STATES PATENT OFFICE.

GEORGE HARFIELD CONRAD, OF HELENA, MONTANA, ASSIGNOR TO KATHRYN M. CONRAD, OF HELENA, MONTANA.

SUPERCHARGER FOR INTERNAL-COMBUSTION ENGINES.

Application filed June 30, 1924. Serial No. 723,397.

*To all whom it may concern:*

Be it known that I, GEORGE HARFIELD CONRAD, a citizen of the United States, residing at Helena, in the county of Lewis and Clark and State of Montana, have invented certain new and useful Improvements in Superchargers for Internal-Combustion Engines, of which the following is a specification.

The invention generally relates to internal combustion engines and primarily has for its object to provide a supercharger for use upon such engines, by the utilization of which the explosive mixture is injected into the explosive chambers of the engine under pressure in a manner providing for increased power and efficiency of such motor over that ordinary in common types of motors and for so increasing the pressure of the explosive charge as to make practical the use of small bore cylinders, rendering possible an engine structure highly efficient under any and all conditions, and which is exceptionally compact and light of weight.

The crying need of the aeroplane industry for highly efficient, powerful, but compact and light of weight power plants has guided the thought and challenged the skill of the inventive mind to produce such a product and one which will include the faculty of overcoming the barrier to "high flying", i. e. rarified air.

Although the special needs of the aviation engine have directed attention to the supercharger, and although the problems of engine power at high altitude do not arise in motor car engines, yet the conventional limit set by the classification of automobile engines by cubic capacity, and the artificial limits enforced to a great extent by taxation make it necessary to consider how more power may be obtained from an engine of given size, both for aviation and ordinary purposes.

It is to the needs above outlined that this invention is addressed and in overcoming the deficiencies of such motors as rely solely on the pressure of atmospheric air and partial vacuum created by the engine pistons to effect fuel induction, I provide a simple construction of supercharger which operates on the two-cycle pump principle, in effectively compressing and forcing the explosive mixture into the engine combustion chambers under perfect valve control, insuring easy handling of the engine by the operator under all conditions, and perfect cooperation with the said engine according to its needs.

With the above and other objects in view the invention further resides in the novel details of construction, combination and arrangement of parts, all of which will be first fully described, then be particularly pointed out in the appended claims, reference being had to the accompanying drawings in which:

Figure 4 is a central vertical cross section of the supercharger.

Figure 5 is an elevation of the supercharger.

Figures 6 and 7 are cross sections, taken at planes normal to each other, of a piston body of the supercharger.

Figure 8 is a detail cross section illustrating a fire screen spliced in the engine intake connections.

The structure described herein acts on the two-cycle rotary pump principle in forcing the explosive mixture into the explosive chambers of the engine when the intake valves thereof are opened in the usual manner. The use of this supercharger makes it possible for the engine to take in under pressure a much greater amount of explosive mixture than possible in present practice, i. e. where the induction is effected by atmospheric pressure alone acting to overcome the partial vacuum created in the cylinders by movement of the pistons thereof.

Obviously, if a larger volume of explosive mixture, drawn from the carburetor, is pressure-injected into the engine cylinder so that, say for example, twice the volume of gas was compressed into the same space per square inch, as in the present practice, at least twice as forceful an explosion will result when ignition occurs.

It should be apparent therefore that an engine equipped with my supercharger will be much more powerful, proportionately to its weight, than one ordinarily equipped.

If used in cooperation with an engine of common piston and cylinder proportions the compression space would preferably be enlarged to prevent such pressure on the compression stroke of the piston as would cause premature ignition, the motor, however, would be much more powerful, proportionately to its weight, because of the more powerful charge and the manner of injecting the same. The same principle applied in construction of new motors, particularly adaptable for aviation purposes, makes possible exceptional compactness and light weight, due to the great reduction of cylinder capacity made possible thereby.

Figure 1:
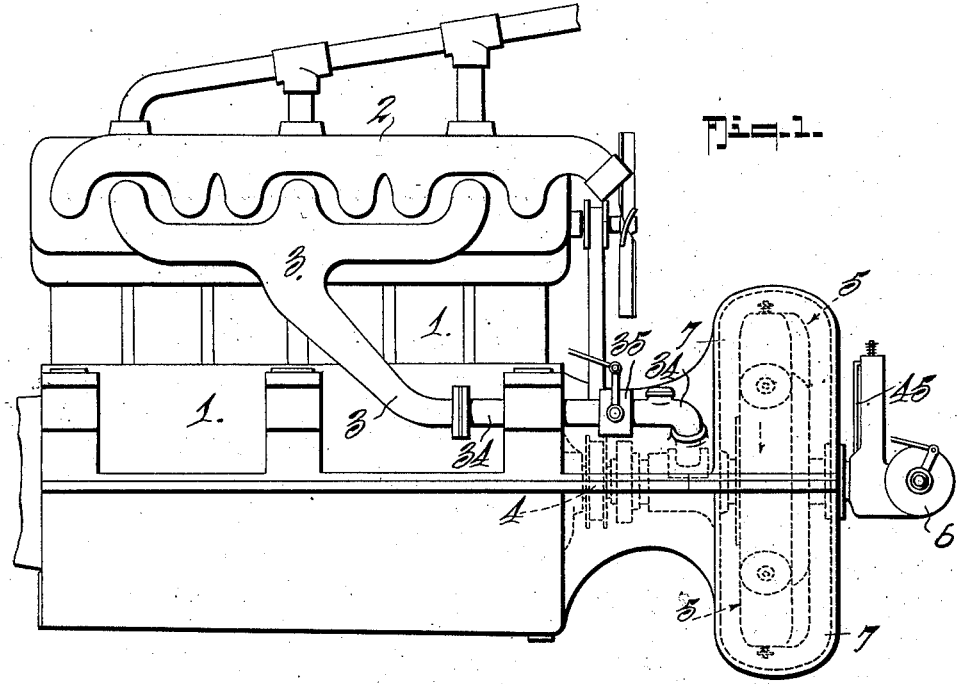
Figure 1 is a side elevation illustrating diagrammatically the manner of application of the invention upon an internal combustion engine.

In the drawings, in which like numerals of reference indicate like parts in all of the figures 1 generally indicates an internal combustion engine, 2 the exhaust manifold, 3 the intake manifold and 4 the crank shaft thereof.

Figure 2:
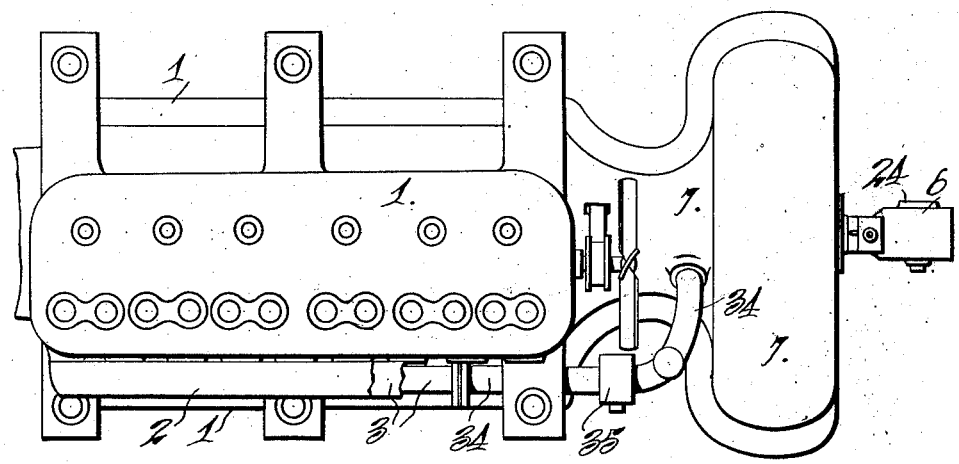
Figure 2 is a plan view of the parts shown in Figure 1.

The application of the supercharger is diagrammatically illustrated in Figures 1 and 2 and the same is designated by the numeral 5.

In the diagrammatic illustrations mentioned a carburetor structure is diagrammatically shown at 6, the same being secured to the housing 7 provided for the supercharger and which may constitute an extension of the engine housing.

The supercharger includes the hollow body portion 8 which serves to provide a central pressure chamber 9, and a plurality of radially extended pressure cylinders 10. A piston 11 is reciprocable in each cylinder by reason of having the wrist pin 12 thereof connected, by the connecting rods 13, with the stationary crank pin 14 carried by the crank arms 15 of the stationary shaft section 16 which is in longitudinal alignment with the engine shaft 4.

The foremost end of the shaft section 16 is provided with a flange 17, by which it is fixedly secured to the housing 7, and is hollow at 18 to provide an intake passage. This intake passage 18 communicates with the outlet passage 19 of the carburetor 6, also with the individual induction passages 20 of the several cylinders through the ports 21. The ports 21 are positioned as shown because of the rotative relation of the entrance ends of the induction passages 20 therewith, and the said induction passages are each in communication with its associated cylinder through the respective valve 22 normally held closed by the spring connection 23.

It should be understood that the carburetor is but diagrammatically indicated and that any approved type thereof may be utilized in the practical development of the invention. In these drawings the intake thereof is designated 24.

The rear stub section of the shaft 16 is provided with a central passage 25 which also passes through the crank arm 15 by which the said section is carried, to thus communicate with the pressure chamber 9.

The hub portions 26 of the supercharger rotatably engages the shaft section 16 at opposite sides of the crank arms 15 and a shaft section 27, flange secured to rotate with the engine shaft 4 as at 28, is secured to the removable cover plate of the supercharger body 8 as at 29.

Steel rings 30 and 31 are provided and mounted in the shaft sections 16 and 27 respectively to prevent leakage between the said section 16 and the hub 26 rotatable thereon and between the said section 27 and the bearing hub portion 32 of the housing extension 7.

Figure 3:
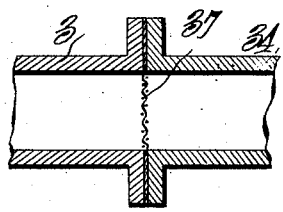
Figure 3 is an enlarged vertical longitudinal section of the supercharger.

The shaft section 27 is hollow to receive the compressed explosive mixture through the passageway 25, and is provided with ports 33 arranged similarly to those 21 of the shaft section 16 and adapted to communicate with the conduit connection 34 which is flange connected in communication with the intake manifold 3, see Figures 1 and 3, a throttle valve 35 being provided in the conduit for controlling the passage of explosive mixture therethrough. The conduit 34 also is provided with a pressure relief valve 36 positioned just ahead of the throttle valve and adapted to relieve an over accumulation of explosive mixture pressure if made necessary by sustained restricted or closed relation of the throttle valve.

Means is provided for protecting the supercharger from harmful effects of possible backfiring of the engine, the said means being in the nature of a fire screen 37 spliced between the flanges connecting the intake manifold 3 and conduit 34, see Figure 8, and a back check valve 38 mounted in the passage formed by the hollow of the shaft section 27.

Means is also provided for automatically controlling the passage of explosive mixture from the carburetor to the interior of the supercharger, the said means being automatically controlled by the pressure within the pressure chamber 9. A cross pass 39 is provided and positioned so that the slide valve 40 slidable therein will control the outlet passage 19 of the carburetor or its equivalent. The valve 40 is carried by the stem 41 which carries the piston 42 slidable in the chamber 43 formed by the housing in which the said stem is slidable. An air vent 44 serves to permit movement of the said piston under pressure of gas mixture conducted to the chamber 43 above the said piston by the conduit pipe 45 which has its open end passed through the outer crank arm 15 into communication with the pressure chamber 9. An adjustable spring device 46 serves to resist the action of pressure on the piston 42 and may be readily regulated to control the degree of mixture admitted into the supercharger in accordance with the pressure desired to be attained and maintained within the chamber 9.

Each piston 11 is provided with a port 47 in the head thereof and a flap valve 48 for alternately opening and closing that port according to the direction of movement of the said piston. As the pistons move outwardly from the axis of the supercharger the valve will open and admit explosive mixture into the cylinders through the pistons, and when the pistons are drawn inwardly the valves close and cause the pistons to compress the indrawn mixture in the cylinders and the pressure chamber.

To prevent any possibility of damage to the supercharger by a too great accumulation of pressure therein, relief valves may be provided. It should be understood that any suitable type of relief valves may be employed and in the drawings the same are diagrammatically indicated as to position by the numerals 49.

In operation the gas and air in an explosive mixture is drawn into the supercharger by the reciprocating motion of its pistons in its cylinders. As each piston is drawn inward, its flap valve closes and an opening of the respective valve 22 is effected, the action causing a supply of explosive mixture to be drawn in through the same into the cylinder above the piston. As the piston moves outward again, the flap valve thereof opens and causes the mixture, trapped above the piston by automatic closing of the valve 22, to pass through the piston into the pressure chamber 9. Thus when the piston again moves inward it effects, by cooperation with the remaining pistons, a compressing of the mixture trapped in the pressure chamber 9. Thus each outward and inward movement of a piston effects an indrawing and then a compression of a quantity of explosive mixture.

It is to be understood that the mixture is admitted into the engine cylinders in the same general manner now common; each time the inlet valve of a cylinder is opened a charge of gas under great pressure flows thereinto, the pressure, amount and richness of the mixture being controlled by the valve 40, the butterfly valve 35, and the usual adjustments with which the particular type of carburetor used may be equipped.

As an illustration, let us assume that the combined cubical capacity in cubic inches of the supercharger cylinders (regardless whether two or more are provided) equals that of the combined cubical capacity of engine cylinders (also regardless of number). In two complete revolutions of the crank shaft of a four-cycle engine, each of its cylinders would have required a charge of gas. The supercharger being of the two-cycle principle would have delivered to that engine, twice the amount of explosive mixture that could have been supplied by the engine alone under the atmospheric pressure induction principle. The pistons of the engine could therefore, with but half the area and the same stroke, provide about the same power that would be possible with pistons twice the area in the ordinary atmospheric pressure induction method.

The small engine pistons thus made possible and practical are very light and are obviously much easier of manipulation and set up much less resistance in reciprocation than present common sizes and are consequently capable of travelling at about twice the usual speed.

The automatic regulating devices 40—46 control the pressure in the supercharger and never allow it to develop above a predetermined point, thereby eliminating all risk of explosion in the intake manifold due to excessive pressure and heat contact when the intake valves are opened at the proper intervals to admit the compressed explosive charge.

As the engine speed is increased, its valve action speed is, of course, correspondingly increased, thus limiting the duration of the open intervals. It will therefore be obvious that an accumulation of pressure in the supercharger will result, as its compressing action will be augmented rather than limited by increased speed of rotation and this assures the induction into the engine cylinders of a full charge of gas despite the extremely brief interval of time during which the valves are open.

When the pressure in the pressure chamber 9 has reached the point where the pressure generated equalizes the demand of the engine, the pressure generation ceases to increase and remains the same so long as the same engine speed is maintained. As the engine speed is increased or diminished, the pressure generation will be correspondingly increased or diminished to maintain the same ratio of 2 to 1 as here used for illustration.

If the pump was made of a larger or smaller capacity relative to that of the engine, instead of the 2 to 1 ratio supposed, the normal pressure in the supercharger and in the intake manifold would be in that ratio to atmospheric pressure.

The automatic regulating devices 40—46 come into play at all times when pressure is being generated in the supercharger in excess of the demands of the engine, this being especially true, of course, when the throttle valve is closed or restricted. In this case, the supercharger continuing to take in the same amount of mixture, the pressure increases and accumulates.

When the pressure becomes great enough per square inch, it acts through the pipe 45 to overcome the tension of the spring 46 and forces the piston 42 down closing off the passage 19 wholly or partially to cut off supply entirely or limit the same according to the needs of the engine.

By increasing the area of the engine pistons, the speed power and gear ratio in the differential can be proportionately increased. In other words, if an engine of larger horse power is desired, it is only necessary to increase the area and stroke of the pistons the same as in an ordinary engine not equipped with a supercharger such as is herein disclosed.

Lubrication by means of oil put in the supercharger casing can be accomplished by centrifugal force, throwing the oil out the end of the cylinders and in turn being carried by the incoming mixture back to the center of the casing again. The supercharger may also be lubricated by putting oil in the gas tank which supplies the gasoline or by mechanical means the same as in any other form of motor.

While the supercharger is here shown as secured directly to and in alignment with the crank shaft of the engine, it is to be understood that it can be placed in other positions relative to the engine shaft and driven therefrom by suitable power transmission mediums. The speed may even be increased over that of the engine shaft, it being obvious that the faster the speed of rotation of the supercharger, the smaller the engine cylinders may be made.

By mounting the supercharger direct in connection with the engine shaft, the same may be used for its intended purpose and also as a substitute for a fly wheel.

While I have shown the valve 22 operated automatically by the suction of the piston it is obvious that mechanical valve operating mechanism of the common type employed in gas engines may be used to operate such valves mechanically at proper intervals if desired.

Furthermore I do not desire it understood that I wish to be restricted to the necessity of having to have the same number of cylinders on the supercharger as the engine has. The number of cylinders in the supercharger may be varied to suit the condition desired. Any number from one up may be used, the capacity of the cylinders and the supercharger being related to that of the engine in such manner that more or less mixture may be charged to the engine. In other words the ratio may be such that only slightly more than the charge the engine cylinders would get under atmospheric charging can be given, or considerable greater charges can be given as may be desired. In other words the supercharger can be designed to give the engine any charge, within practical limits, upwardly from one equal to which it would receive under the present ordinary running conditions, i. e., the charge it would receive by drawing it in to itself.

From the foregoing description, taken in connection with the accompanying drawings, it is thought the novel details of construction, the manner of operation, and the advantages of the invention will be readily apparent to those skilled in the art to which it relates.

What I claim is:

1. A supercharger for internal combustion engines comprising a casing, a crank shaft stationarily mounted in said casing, a rotor rotatably mounted on said crank shaft and containing a cylinder, a piston within said cylinder and a connecting rod between said piston and said crank shaft, an inlet valve in the cylinder and a by-pass valve in the piston whereby charges may be drawn into the cylinder and compressed within the central portion of the rotor, an outlet duct from the central portion of the rotor through which the compressed gases are delivered, an inlet duct to the cylinder head, a cutoff valve associated with said inlet duct to govern the passage through the same, and mechanism governed by the pressure within the central chamber of the rotor for manipulating said cutoff valve substantially as shown and described.

2. A supercharger for internal combustion engines comprising a casing, a crank shaft stationarily mounted in said casing, a rotor rotatably mounted on said crank shaft and containing a cylinder, a piston within said cylinder and a connecting rod between said piston and said crank shaft, an inlet valve in the cylinder and a by-pass valve in the piston whereby charges may be drawn into the cylinder and compressed within the central portion of the rotor, an outlet duct from the central portion of the rotor through which the compressed gases are delivered, an inlet duct to the cylinder head, a cutoff valve associated with said inlet duct to govern the passage through the same, mechanism governed by the pressure within the central chamber of the rotor for manipulating said cutoff valve, a back check valve in the outlet duct from said rotor, a duct delivering the compressed charge from said rotor outlet duct, a throttle valve in said delivering duct, a pressure relief valve associated with said delivering duct, and another pressure relief valve associated with said rotor for relieving excessive pressure.

3. A supercharger for internal combustion engines, which comprises a housing having a bearing, a driving shaft journalled in said bearing, a rotor comprising a plurality of cylinders having a common crank case and secured to and rotatable with said driving shaft, a crank shaft mounted in said housing in alignment with said driving shaft and having a bearing portion projected into said driving shaft, said driving shaft being hollow and said bearing portion having passage to effect communication between said crank case and said hollow driving shaft, a back check valve in said hollow driving shaft, a duct leading from said hollow driving shaft, said crank shaft having an inlet passage closed off from the crank case, ducts leading from said inlet passage to the several cylinder heads of the rotor, a back check valve in each cylinder head, pistons in said cylinders and having valve controlled passages through the same, connecting rods between said pistons and said crank shaft, said ducts which lead to the cylinder heads having a common bearing portion on said crank shaft, a slide valve controlling the passage into said inlet duct, a spring and piston and cylinder device connected with said slide valve, and a duct leading from said crank case through said inlet duct to the cylinder of said piston and cylinder device to govern the position of said slide valve.

4. A supercharger for internal combustion engines comprising a casing, a crank shaft stationarily mounted in said casing, a rotor rotatably mounted on said crank shaft and containing cylinders, pistons within said cylinders and connecting rods between said pistons and said crank shaft, inlet valves in the cylinder heads and by-pass valves in the pistons whereby charges may be drawn into the cylinders and compressed within the central portion of the rotor, an outlet duct from the central portion of the rotor through which the compressed gases are delivered, inlet ducts to the cylinder heads, a cutoff valve associated with said inlet ducts to govern the passage through the same and mechanism governed by the pressure within the central chamber of said rotor for manipulating said cutoff valve substantially as shown and described.

5. A supercharger for internal combustion engines comprising a casing, a crank shaft stationarily mounted in said casing, a rotor rotatably mounted on said crank shaft and containing cylinders, pistons within said cylinders and connecting rods between said pistons and said crank shaft, inlet valves in the cylinder heads and by-pass valves in the pistons whereby charges may be drawn into the cylinders and compressed within the central portion of the rotor, an outlet duct from the central portion of the rotor through which the compressed gases are delivered, inlet ducts to the cylinder heads, a cutoff valve associated with said inlet ducts to govern the passage through the same, and mechanism governed by the pressure within the central chamber of said rotor for manipulating said cutoff valve, a back check valve in the outlet duct from said rotor, a duct delivering the compressed charge from said rotor outlet duct, a throttle valve in said delivering duct, and a pressure relief valve associated with said delivering duct, and another pressure relief valve associated with said rotor for relieving excessive pressures for the purposes specified.

6. A supercharger for internal combustion engines comprising a rotor having a number of cylinder portions and a crank case portion, a stationary crank shaft on which said rotor is journalled, pistons operating in the cylinders of said rotor and connecting rods connecting said pistons with said crank shaft, said pistons having passages, one way valves controlling said passages, inlet valves in the cylinder heads, said crank shaft having an inlet duct and an outlet duct, branch ducts effecting communication between the inlet duct of the crank shaft and the cylinder heads, a shaft section to which said rotor is attached and by which said rotor is turned, said shaft section having a passage in communication with the outlet duct of said crank shaft, means for conveying the compressed contents of said rotor from said shaft section duct for delivery to the place of use, and a supporting bearing in which said shaft section is journalled.

7. A supercharger for internal combustion engines comprising a casing, a crank shaft stationarily mounted in said casing, a rotor rotatably mounted on said crank shaft and containing cylinders and a crank chamber, pistons within said cylinders and connecting rods between said pistons and said crank shaft, inlet valves in the cylinder heads and by-pass valves in the pistons whereby charges may be drawn through the heads into the cylinders and compressed within the central portion of the rotor, an outlet duct in axial alinement with the crank shaft for delivering the compressed gases from the central portion of the rotor, a back check valve in said duct, inlet ducts to the cylinder heads, a cutoff valve associated with said inlet ducts to govern the passage through the same, and mechanism governed by the pressure within the central chamber of said rotor for manipulating said cutoff valve, substantially as shown and described.

8. A supercharger for internal combustion engines comprising a casing, a crank shaft stationarily mounted in said casing, a rotor rotatably mounted on said crank shaft and containing cylinders and a crank chamber, pistons within said cylinders and connecting rods between said pistons and said crank shaft, inlet valves in the cylinder heads and by-pass valves in the pistons whereby charges may be drawn through the heads into the cylinders and compressed within the central portion of the rotor, an outlet duct in axial alinement with the crank shaft for delivering the compressed gases from the central portion of the rotor, a back check valve in said duct, inlet ducts to the cylinder heads, a cutoff valve associated with said inlet ducts to govern the passage through the same, and mechanism governed by the pressure within the central chamber of said rotor for manipulating said cutoff valve, said rotor cylinders having relief valves for the purpose specified.

9. A supercharger for internal combustion engines, comprising a casing, a crank shaft stationarily mounted in said casing, a rotor rotatably mounted on said crank shaft and containing cylinders, pistons within said cylinders and connecting rods between said pistons and said crank shaft, inlet valves in the cylinder heads and by-pass valves in the pistons whereby charges may be drawn into the cylinders and compressed within the central portion of the rotor, an outlet duct arranged in axial alinement with said crank shaft for conveying the compressed mixture from the central portion of the rotor, said crank shaft being hollow and having outlet ports, ducts between said outlet ports of the crank shaft and cylinder heads, a cutoff valve associated with said crank shaft to govern the passage through the same, said cutoff valve including an operating cylinder, piston and piston rod and a slide valve, and a duct between said cutoff valve piston and the central chamber of the rotor, whereby the operation of said cutoff valve will be governed by the pressure within the central chamber of the rotor, a back check valve in the outlet duct from said rotor, a duct delivering compressed charges from said rotor outlet duct, a throttle valve in said delivering duct, and a pressure relief valve associated with said delivering duct for the purposes specified.

10. A supercharger for internal combustion engines comprising a rotor having a cylinder portion and a crank case portion, a stationary crank shaft in which said rotor is journalled, a piston operating in the cylinder of said rotor and a connecting rod connecting said piston with said crank shaft, said piston having a passage, a one-way valve controlling said passage, an inlet valve in the cylinder head, said crank shaft having an inlet duct and an outlet duct, a branch duct effecting communication between the inlet duct of the crank shaft and the cylinder head, a shaft section to which said rotor is attached and by which said rotor is turned, said shaft section having a passage in communication with the outlet duct of said crank shaft, means for conveying the compressed contents of said rotor from said shaft section duct for delivery to the place of use, and a supporting bearing in which said shaft section is journalled.

11. A supercharger for internal combustion engines comprising a rotor having a cylinder portion and a crank case portion, a stationary crank shaft on which said rotor is journalled, a piston operating in the cylinder in said rotor and a connecting rod connecting said piston with said crank shaft, said piston having a passage, a one-way valve controlling said passage, an inlet valve in the cylinder head, said crank shaft having an inlet duct and an outlet duct, a branch duct effecting communication between the inlet duct of the crank shaft and the cylinder head, a shaft section to which said rotor is attached and by which said rotor is turned, said shaft section having a passage in communication with the outlet duct of said crank shaft, means for conveying the compressed contents of said rotor from said shaft section duct for delivery to the place of use, a supporting bearing in which said shaft section is journalled, a cutoff valve associated with said inlet duct to govern the passage through the same, and mechanism governed by the pressure within the central chamber of the rotor for manipulating said cutoff valve substantially as shown and described.

GEORGE HARFIELD CONRAD.